F. J. KRISTOFEK.
ADJUSTABLE PAD HOLDING MEANS.
APPLICATION FILED FEB. 24, 1920.
1,376,945.
Patented May 3, 1921.
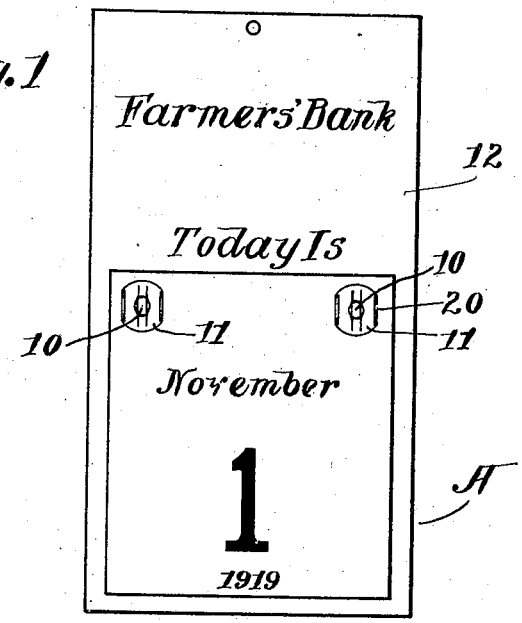
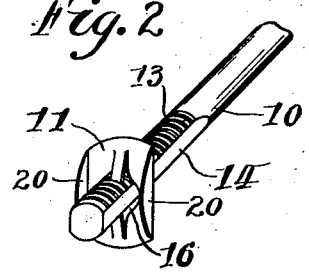
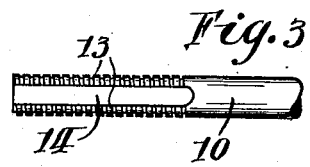
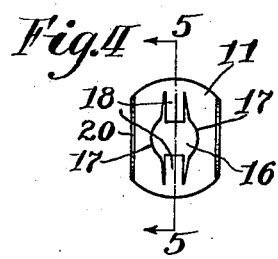
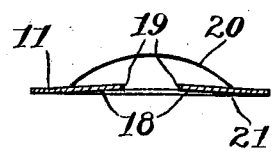
Inventor:
Frank J. Kristofek
by: Attÿ.

UNITED STATES PATENT OFFICE.

FRANK J. KRISTOFEK, OF ST. PAUL, MINNESOTA, ASSIGNOR TO BROWN & BIGELOW, OF ST. PAUL, MINNESOTA, A CORPORATION OF MINNESOTA.

ADJUSTABLE PAD-HOLDING MEANS.

1,376,945.  Specification of Letters Patent.  Patented May 3, 1921.

Application filed February 24, 1920. Serial No. 360,652.

*To all whom it may concern:*

Be it known that I, FRANK J. KRISTOFEK, a citizen of the United States, residing at St. Paul, in the county of Ramsey and State of Minnesota, have invented a new and useful Improvement in Adjustable Pad-Holding Means, of which the following is a specification.

My invention relates to an adjustable pad holding means and its primary object is to provide an easy and quick adjustment of the washer nut which holds a pad in place on the supporting studs.

In various forms of calendars where a daily pad is attached thereto and where it is desired to have means so that the pad can be quickly replaced by a new pad or to take up the slack between the leaves to hold the remaining portion of the same firmly in place, it is most desirable to have means which are quickly and easily adjustable. My device is designed to accomplish these features.

In the drawings forming part of this specification:

Figure 1 is a front view of one form of calendar using a daily pad, which is held in place by my adjustable pad holding means.

Fig. 2 is a perspective view of a portion of one of the pad holding studs with the adjustable washer nut in one position thereon.

Fig. 3 is a plan view of one of the pad holding studs.

Fig. 4 is a plan view of a nut washer of my device.

Fig. 5 is a sectional view of the washer on the line 5—5 of Fig. 4.

The drawings illustrate a calendar pad A, which is adjustably held in place on the threaded studs 10 by the nut washers 11 to the calendar back 12. The calendar holding studs 10 are formed with a thread 13, while the same is cut away on either side to form flat, smooth surfaces 14 along the length of the thread 13 on the studs 10.

The holding nut washer 11 is adapted to fit on the studs 10 and is formed with a central opening 16, through which the stud extends, while oppositely disposed notched portions 17 are adapted to freely engage over the threads 13 on the studs 10 when the washer 11 is turned with the notches coinciding with the diametrically, oppositely disposed threaded portions 13 on the studs 10.

Spring arms 18 are formed with free ends 19, being cut from the body portion of the washer 11, the arms extending inward from the opening 16 and being oppositely disposed from each other at right angles to the oppositely disposed notched portions 17 so that the washer nut 11, when turned on the stud 10 with the arms 18 out of engagement with the threads 13, will cause the arms 18 to engage the smooth surfaces 14 under spring tension but free to be moved longitudinally of the stud, 10.

Thus to loosen the washers 11 on the studs 10 it is only necessary to turn the same a quarter turn, whereupon the washer nut can be removed by pulling the same off of the holding stud 10. Finger engaging ears 20 are formed on the sides of the nut washer 11 by bending the same upward to allow them to be easily engaged by the fingers. The engaging ears 20 extend from the front face of the washers so as to provide a smooth back face 21 to the washer 11, which is adapted to engage the pad A to hold it in place on the studs 10.

When the nut or lock washers 11 are removed from the studs a new pad can be readily placed thereon and the washer slipped over the ends of the studs with the spring fingers 18 engaging the smooth portions 14 and after the smooth back 21 of the washer has been formed against the outer surface of the pad as tight as it is desired to hold the same on the studs it is turned a quarter turn, whereupon the arms 18 will engage the threads 13 at this position and tend to draw the same tightly against the pad.

This construction for holding a pad is adaptable for use on any device where it is desired to hold a pad firmly in place and is readily adjustable to different thicknesses of pads without making it necessary to turn the lock washer 11 on the studs 10 more than a quarter of a turn, it being obvious that the washer 11 can be adjusted or brought into engagement with the threads 13 at any point on the stud. The spring arms 18 readily hold the washer in place on the threaded portion of the stud 10 when engaging the threads 13.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims:

1. An adjustable pad holding means, including a stud having threaded portions, a smooth, longitudinally extending portion on said stud between said threaded portions and a lock nut formed of thin sheet material having means for engaging said threaded portions to lock a pad to said stud and means for freely engaging said threaded portions by turning said lock washer a quarter turn so that it can be moved freely longitudinally of said stud without being rotated on said threaded portion.

2. An adjustable pad holding means, comprising a holding stud having longitudinally extending, smooth portions and longitudinally extending threaded portions, a lock nut washer having means for engaging said threaded portions to lock a pad on said stud and means for engaging said threads under spring tension by turning said washer a quarter turn, said washer being locked on said stud when said spring means is in engagement with said threaded portion, whereby said washer can be locked to said stud without screwing the same by a complete rotation on said stud.

3. A pad fastener, including a threaded member for holding a pad, smooth surfaces extending on said threaded member, a pad holding washer, finger engaging ears formed on said washer, thread engaging spring arms formed in said washer and notches adapted to freely receive the threads of said threaded member when said arms are engaging said smooth surfaces to allow the washer to be moved freely longitudinally of said threaded member to remove it from the same or to readily adjust it thereon.

FRANK J. KRISTOFEK.